(12) United States Patent
Kirst

(10) Patent No.: US 7,663,350 B2
(45) Date of Patent: Feb. 16, 2010

(54) EXTERNAL ELECTRICAL ENERGY SUPPLY FOR FIELD DEVICE

(75) Inventor: Michael Kirst, Lörrach (DE)

(73) Assignee: Endress + Hauser Flowtec AG, Reinach (CH)

( * ) Notice: Subject to any disclaimer, the term of this patent is extended or adjusted under 35 U.S.C. 154(b) by 236 days.

(21) Appl. No.: 11/826,235

(22) Filed: Jul. 13, 2007

(65) Prior Publication Data

US 2008/0013226 A1  Jan. 17, 2008

Related U.S. Application Data

(60) Provisional application No. 60/830,340, filed on Jul. 13, 2006.

(30) Foreign Application Priority Data

Jul. 13, 2006 (WO) ................ PCT/EP2006/064232

(51) Int. Cl.
*G05F 1/40* (2006.01)
(52) U.S. Cl. ..................................... 323/268
(58) Field of Classification Search ................ 323/266, 323/268, 271, 282, 285, 350, 351; 363/34, 363/37; 307/52, 71, 85, 86
See application file for complete search history.

(56) References Cited

U.S. PATENT DOCUMENTS

| 5,006,975 | A | * | 4/1991 | Neufeld ........................ 363/80 |
| 5,436,550 | A | * | 7/1995 | Arakawa ..................... 323/222 |
| 6,269,012 | B1 | * | 7/2001 | Kusakabe et al. ............. 363/84 |
| 6,373,735 | B2 | * | 4/2002 | Usui ........................... 363/89 |
| 6,397,322 | B1 | | 5/2002 | Voss |
| 2003/0074500 | A1 | | 4/2003 | Takeuchi |

FOREIGN PATENT DOCUMENTS

WO    WO 02/103327 A1   12/2002

\* cited by examiner

*Primary Examiner*—Matthew V Nguyen
(74) *Attorney, Agent, or Firm*—Bacon & Thomas, PLLC

(57) ABSTRACT

A field-device electronics for a field device. The field device electronics is supplied from an external electrical energy supply providing a supply voltage and delivering a variable supply current driven by the supply voltage. The field-device electronics includes an internal control unit for controlling the field device, as well as at least one internal supply circuit feeding the internal control unit. The supply current is a mixed current formed by superimposing and/or modulation of an alternating current portion onto a direct current portion. The internal supply circuit uses, at least at times and/or at least in part, also the alternating current portion of the mixed current for covering an instantaneous energy requirement of the control unit.

19 Claims, 3 Drawing Sheets

EXTERNAL ELECTRICAL ENERGY SUPPLY FOR FIELD DEVICE

This application is a Nonprovisional Application, which claims the benefit of U.S. Provisional Application 60/830,340 which was filed on Jul. 13, 2006, which is the National Stage proceeding of PCT/EP2006/064232 which was filed on Jul. 13, 2006.

TECHNICAL FIELD

The invention relates to a field device electronics fed from an external electrical energy, or power, supply, wherein the external electrical energy supply provides a supply voltage and delivers a variable supply current driven thereby.

BACKGROUND DISCUSSION

Progress in microelectronics in recent years has resulted in a miniaturization of devices and integration of functionalities. This has led to an effective and economic application of integrated, decentral systems in automation technology. Thus, not only are measured values ascertained in sensors and actuators, but also the measured values are already preprocessed, linearized and even a self-diagnosis of the sensor or actuator implemented. Prerequisite for introduction of these decentral functionalities into a closed automation concept with "intelligent" sensors and actuators is an increased information- and data-exchange of these decentral units among themselves and with a control system. In automation technology, for this reason, many fieldbus systems have been proposed lately. These cover either company-specific application areas (e.g. BITBUS, CAN, MODBUS, RACKBUS) or are the subject of international standard (e.g. HART, PROFIBUS-PA, Foundation FIELDBUS, Ethernet). A large number of fieldbus systems currently used in industrial automation technology and process control technology fall, furthermore, still only under the heading "fieldbus", or "fieldbus system".

Usual field devices are grid-fed, four-conductor, measuring devices, and must, for such purpose, have at least two electrical wires leading to the device for energy supply. Furthermore, two more, signal conductors are needed, which transmit the signal carrying the measured value or other communication data signals between the decentral units and a control location. In general, this measurement signal or communications data signal is produced and forwarded according to a standard usual for such purposes, e.g. the current loop standard (involving an electrical current lying between 4 mA and 20 mA), a frequency standard, or a digital standard.

Moreover, in automation technology, it is also common to construct the field devices according to a so-called two-conductor technology and to connect them with one another, so that energy feeding and communications between the devices can occur via a single pair of lines, whereby the wiring effort and, consequently, the networking costs of networked, decentral automation systems can be decreased.

Such two-conductor field devices are treated in, among others, EP 0 883 097 B1, EP 0 895 209 B1, EP 1 158 274 A1. These two-conductor field devices produce as a measurement signal an output current, whose instantaneous values match as proportionally as possible a measuring transducer signal produced by means of a physical-to-electrical, measuring transducer. The two conductors serve both for supply of energy (under open- or closed-loop control), for which a direct voltage source is applied externally onto the two conductors, as well as also for transmission of the measurement signal.

A further aspect, which must be heeded in automation technology and especially in process automation technology, is that the field device must be able to operate in an explosion-endangered area, with intrinsic safety of the field device and fieldbus assured. Such intrinsically safe, low-reflection, fieldbus systems are known from DE 100 49 233 A1, DE 101 27 561 A1, DE 102 45 273 A1 and the CIS (continuous interruption supply) energy supply concept of the Physikalisch-Technische Bundesanstalt Braunschweig, Germany, which treat the problems of alternating voltage- and alternating current-signals on fieldbusses. Common to all these citations is that the energy transmission over the fieldbus is done alone by a high-frequency alternating signal and this fieldbus fulfills intrinsic safety by protective measures and/or is embodied to be low reflection by adaptations of the wave resistance.

SUMMARY OF THE INVENTION

Starting with the above set forth state of the art, an object of the invention is, therefore, to enable communications of a field device via a two-wire line and additionally to supply the field device via this two-wire line continuously with the necessary energy, while meeting standards and specifications for explosion protection.

For achieving the object, the invention resides in a field device electronics provided for a field device and fed by an external electrical energy supply, wherein the external electrical energy supply provides a supply voltage and delivers a variable supply current driven thereby. The field device electronics includes: A internal control unit for controlling the field device; as well as at least one internal supply circuit feeding the internal control unit; wherein the supply current is a mixed current formed by a superimposing and/or modulation of an alternating current portion onto a direct current portion; and wherein the internal supply circuit uses at least at times and/or at least in part also the alternating current portion of the mixed current for covering an instantaneous energy requirement of the control unit.

In an advantageous form of embodiment of the solution of the invention, the direct current portion of the mixed current serves as an information carrier or communication means for data transmitted via the two-wire connecting line.

A useful embodiment of the field device of the invention provides that the direct current portion of the mixed current assumes values within a current range of 4 mA to 20 mA. In the case of two-conductor field devices corresponding to the mentioned current loop standard lying between 4 mA and 20 mA, a particular current value within this current range corresponds exactly to an electrical sensor signal or control signal. Therefore, only the current range of 4 mA can be planned for and used for the guaranteed energy supply of the electronics of the electronics of the field device with a two-wire line. This means that the energy supply is available only with a power of around 50 mW, which will be referred to in the following as low power. Two conductor field devices with the mentioned current loop standard lying between 4 mA and 20 mA are therefore especially well suited for use in explosion-endangered environments.

In an advantageous form of embodiment of the solution of the invention, it is provided that the alternating current portion of the mixed current assumes a frequency of greater than 10 Hz (Hertz), especially greater than 50 Hz.

An advantageous embodiment of the solution of the invention provides that the mixed current assumes at least an effective value, which is smaller than or equal to a highest permissible limit value.

In a favorable embodiment of the field device of the invention, it is provided that the highest permissible limit value of the effective value of the mixed current amounts to 20 mA. In order not to violate specifications for explosion protection, the maximum effective value of the mixed current should not be greater than this limit value.

An advantageous embodiment of the solution of the invention provides that the effective value of the alternating current component, or portion, of the mixed current, as modulated onto the direct current component, or portion, assumes a difference value of the direct current portion of the mixed current present on occasion relative to the highest permissible limit value of the mixed current. In order that the field device can always be supplied with the maximum permissible current, the difference of the direct current portion of the mixed current is supplemented by the effective value of the, for example rectified, alternating current portion of the mixed current, so that their sum achieves the highest permissible limit value. In this way, the field device is continuously supplied with the maximum energy, or power.

In an advantageous embodiment of the field device of the invention, it is provided that an alternating current portion of the mixed current negatively superimposed on the direct current portion draws away excess energy present in the field device and, in this way, thus controls the energy requirement, or energy balance, of the field device, in case too much energy is available to the field device electronics. If a negative (relative to the direct current portion) effective value of the alternating current component is produced in the AC/DC converter by, for example, performing a transformation of the alternating current portion of the mixed current such that a rectified alternating current portion of the mixed current negative to the direct current portion is formed, then excess current can be cancelled out of the field device.

A very advantageous variant of the solution of the invention provides that the alternating current portion of the mixed current has a sinusoidal signal form. Preferably, sinusoidal signals are used as the alternating current portion of the mixed current, since their signal spectra contain no higher harmonic waves, and this means that requirements concerning "electromagnetic compatibility" (EMC) are easier to meet. Also, a superimposing with other direct current portions, or signals, is more easily possible, for the temporal average value of sinusoidal signal forms is zero and the coding is therefore average-value-free.

An especially advantageous further development of the solution of the invention provides that the alternating current portion of the mixed current has a rectangular and/or pulsed signal form.

An advantageous embodiment of the solution of the invention provides that a controlled alternating current source in the external energy supply produces the alternating current portion of the mixed current.

A very advantageous variant of the solution of the invention provides that a switching unit in the field device electronics of the field device produces the alternating current portion of the mixed current by means of load modulation. By the changing electrical-current loading of the external energy supply according to the electrical-current requirements changeable with a corresponding frequency in the field device, the alternating current portion of the mixed current is produced.

A preferred form of the field device of the invention provides that a control unit is integrated in the field device electronics to serve for control of the switching unit on the basis of current and future energy requirements, e.g. energy budget, of the field device and/or, further, to serve for controlling, on the basis of current and future field-device electrical sensor signals or control signals for controlling the current controller, which assumes the task of setting the direct current, information-carrier portion of the mixed current.

According to an advantageous form of embodiment of the solution of the invention, it is provided that the control unit determines and calculates future energy requirement of the field device taking into consideration and estimating the processes and applications to be run in the future.

An expedient example of an embodiment of the field device of the invention provides that at least one sensor is included for sensorially registering a chemical and/or physical process parameter and for delivering a corresponding electrical sensor signal.

A very advantageous variant of the solution of the invention provides that at least one actuator activated by an electrical control signal is included, which adjusts the at least one chemical and/or physical process parameter.

An alternative example of the field device of the invention provides that, for achieving its purpose, at least one AC/DC converter and/or at least one DC/DC converter are/is included as internal supply circuit.

An advantageous form of embodiment of the solution of the invention includes that the transmitted data are measured values derived from the sensor signal by means of the field device electronics and/or mapped by means of the external energy supply.

An especially advantageous further development of the solution of the invention provides that the received data are control values to be adapted by means of the external energy supply and/or converted by means of the field device electronics into the control signal.

In a further, advantageous embodiment of the solution of the invention, it is provided that a further alternating current portion of the mixed current, e.g. the Hart signal, which is distinguishable from the alternating current portion and/or separated in frequency range, is modulated on as an information carrier. Field devices, which employ an additional Hart signal, exchange their data via the two-wire lines of the 4 to 20 mA current-loop standard. With the help of this communication, the field devices can be very flexibly parametered and placed into operation, or ascertained and stored measured values, or data, can be very flexibly read-out from the field devices. The Hart protocol enables bidirectional communications also in explosion-endangered environments. Hart enables a point-to-point transmission by at least two participants. The data, made discrete and digitized, are transmitted and received via a special modem, which must be present in each participant, in a Hart protocol with the FSK method. The FSK method (Frequency Shift Keying) uses for distinguishing binary states different frequencies of a sinusoidal signal (e.g. Bell 202 Standard is "0" 2200 Hz, "1" 1200 Hz). Since this method is largely independent of level, it offers, even in the case of signal dampings and varying loads, a high disturbance resistance. Of course, it is necessary to make sure that the transmission medium is capable of transmitting the frequencies used for the coding. If, for energy supply of the field device, a sinusoidal signal form of the alternating current portion is used, then the frequency of the Hart signal must be different from that of the alternating current portion of the mixed current, in order that the two alternating current portions can be re-separated, for example by a filter, and then further processed separately.

In an advantageous form of embodiment of the solution of the invention, it is provided that the energy requirement of the filed device is covered at least in part by the direct current portion of the mixed current.

BRIEF DESCRIPTION OF THE DRAWINGS

The invention and selected examples of embodiments will now be explained in greater detail on the basis of the appended drawings. For simplification, in the drawings, identical parts are provided with the same reference characters, which are, however, then only repeated, when it is helpful to do so. The figures of the drawing show as follows.

DETAILED DISCUSSION

Figure 1:
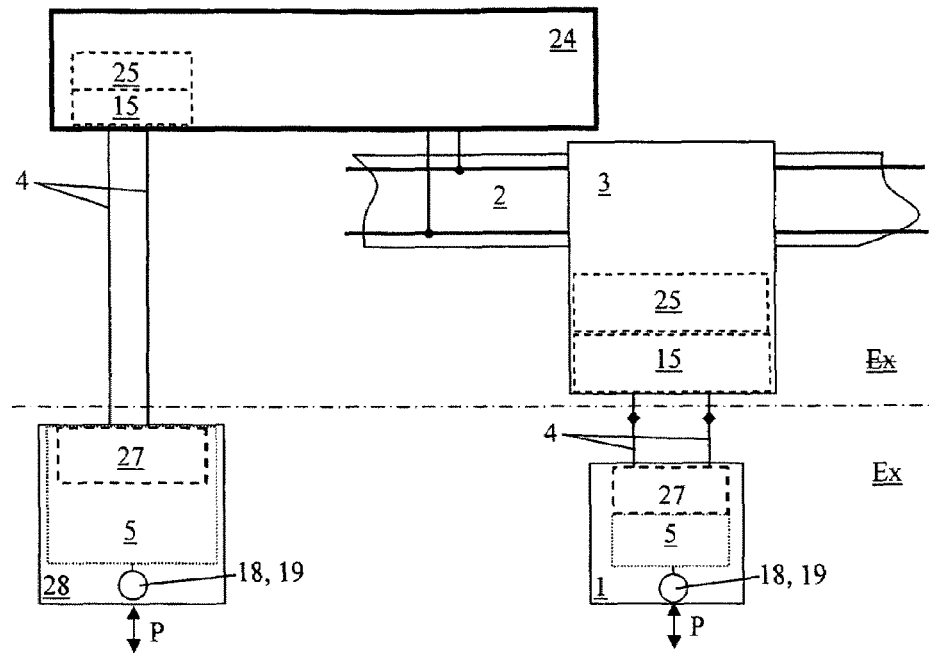
FIG. 1 a schematic representation of a field device connected to a fieldbus via a bus interface.

The block diagram shown in FIG. 1 presents the most important segments of a decentral automation system for process parameter registering, evaluation and transmission. Additionally, field devices 1 are frequently embodied in such a manner that they communicate with a remote control location 24 or a further field device 28, and obtain the required energy via one of the usual, external fieldbus systems 2. This can, on the one hand, occur by direct connection to the fieldbus system 2, e.g. operating according to the FIELDBUS protocol. On the other hand, the interactions can occur indirectly on the basis of an interposed bus-coupler 3, e.g. operating according to the so-called HART protocol. The components of the decentral automation system shown in the right portion of FIG. 1 are thus connected together in such a manner that a field device 1, which works, for example, according to the PROFIBUS PA protocol, is connected indirectly to the external fieldbus system 2 via a bus interface, or bus coupler, 3. A direct connection of the field device 1 to the external fieldbus system 2, for example according to the FIELDBUS protocol, is not explicitly shown in FIG. 1; it is, however, also possible to embody the invention on the basis of a direct connection of the field device 1 to the fieldbus system 2.

Field device 1 includes, in general, a field device electronics 5 and a sensor 18 or an actuator 19. Representing an integral or appended part of the field device electronics 5 is the measurement transmitter 27, which registers the electrical control signal Stell of the actuator 19 or the electrical sensor signal Sens of the sensor 18 and converts such into corresponding data D, or measurement dat, as the case may be. By way of example, at least the control unit 17 can be integrated in the measurement transmitter 27.

An example for such sensors 18 is especially flow measuring transducers, which ascertain, via the Coriolis principle or the magneto-inductive measuring principle, the flow of a medium flowing at least at times. Another example is fill- or limit-level transducers for ascertaining fill level in a container according to travel-time of high-frequency, or acoustic, measuring signals. In process automation, a control drive for a valve is an example of an actuator 19.

The field device 1 of the decentralized automation system, as shown in the right of FIG. 1, is, for example, connected directly with the control location 24 via a two-wire connecting line 4. In the case of this example of an embodiment, communications and the energy supply of the field device 1 occurs via the two-wire connecting line 4 by the external energy supply 25 and/or the controlled alternating current source in the control location 24, for example, according to the HART standard and/or 20 mA current-loop standard, respectively the Teletype standard. In the HART standard and/or the TTY standard, also yet other field devices 28 are connectable to this two-wire connecting line 4, this, however, not being explicitly embodied in FIG. 1.

Integrated in the field device 1 is a field device electronics 5, which is connected via the two-wire connecting line 4 with the module of the controlled alternating current source 15 and/or the external energy supply 25 in the respective units, such as e.g. the control location 24, the bus coupler 3 or further field devices 28. The chemical or physical process parameter P acts on the sensor, or measuring transducer 18, or is changed or provided by the actuator, or signal converter, 19. The registered, or set, change of the chemical or physical process parameter P by the sensor 18 or actuator 19 is further processed by the field device electronics 5 and transmitted via the two-wire connecting line 4, for example, to the bus interface 3 or directly to the control location 24.

By protective measures in the field device 1 and possible measures in the bus coupler 3, the two-wire connecting line 4 and the field device 1 are embodied to be intrinsically safe and separate in the explosion protection region $Ex_1$ from the non-explosion protection region $Ex_2$. The field device 1 can, because of this intrinsically safe separation, be used in an explosion-protection region $Ex_1$, in which, for example, an explosive gas-atmosphere exists.

Figure 2:
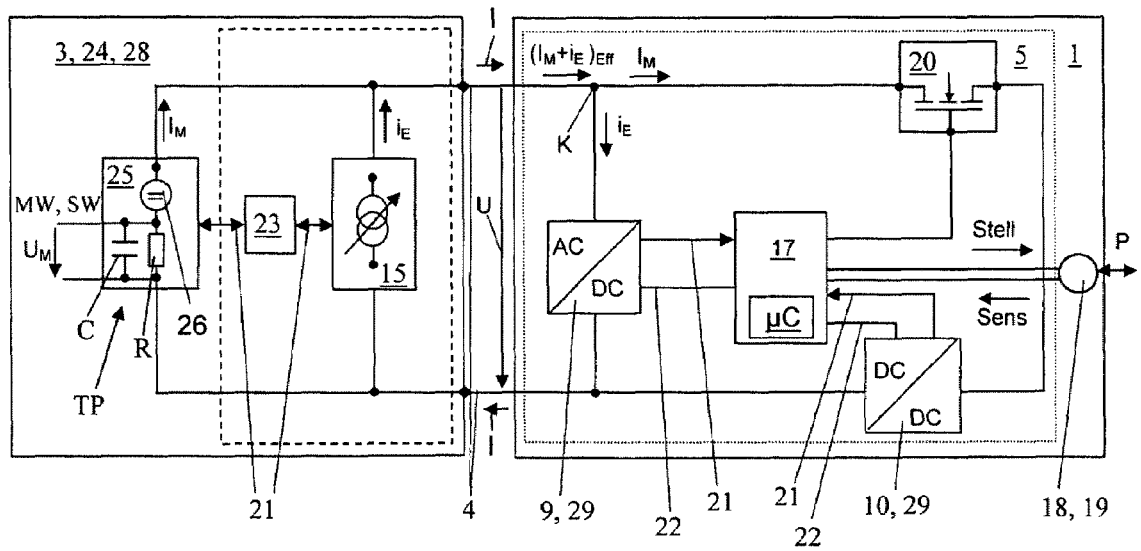
FIG. 2 a first example of a circuit of a field device of the invention, with the field device being connected to the fieldbus via a bus interface.

FIG. 2 shows the component parts of FIG. 1 in more detail, with an external energy supply 25 being integrated symbolically in the bus interface 3 with a direct voltage source 26, which delivers a measurement current $I_M$. This measurement current $I_M$ flows through a resistor R and produces a voltage $U_M$ dependent on the measurement current $I_M$ and representing the measured value MW. This measurement voltage is, for example, further processed in the bus interface 3, digitized, and output on the external fieldbus system 2. Furthermore, it is, however, also possible to transmit this measurement voltage $U_M$ directly via the connecting line 4 to the control location 24 or to a further field device 28. The capacitor C is connected in parallel with the resistor R and forms therewith in the external energy supply 25 a lowpass TP, which damps disturbing alternating voltage signals having a frequency higher than the limit frequency and present in the measurement voltage signal $U_M$ of the measured value MW or the control value SW. Instead of the above-described elements (R, C), some other kind of evaluating and in-feeding unit in the bus interface 3 can be integrated into the current loop for coupling data and signals from the external fieldbus system 2 into the current loop of the two-wire connecting line 4 or for converting the measurement current $I_M$ and for transmitting such to the same according to the standard of the external fieldbus system 2 or the connecting line 4.

As a further component, there is connected in parallel with the bus interface 3 of the fieldbus system 2, or the control location 24, a controlled alternating current source 15, which feeds the one injected current $i_E$ into the two-wire connecting line 4. This controlled alternating current source 15 can also be integrated in the external energy supply 25 of the bus interface 3, the measurement transmitter 27 or the control location. An advantage of a modular construction of the controlled alternating current source 15 and the external energy supply 25 is that existing external energy supplies 25, which only possess a direct voltage source 26, can be easily retrofitted with an alternating current module. The alternating current source 15 and the direct voltage source 26 communicate via a separate control and data line 21 and an interposed, connected current control unit 23 for controlling the electrical-current ratio of the alternating current portion 7 and the direct current portion 8 of the mixed current 6. Applied to the terminals of the connecting line 4 is thus a supply voltage U, which drives a supply current I composed of the injected current $i_E$ and the measurement current $I_M$. This current control unit 23 is present for mixing with the measurement current $I_M$ an appropriately fitted, additional alternating current $i_E$ in a certain ratio, depending on how much measurement current $I_M$ is requested by the field device 1 or fed-in from the external fieldbus system by the internal electronics of the bus coupler 3, so that the effective value of the summation current $(I_M + i_E)_{Eff}$ is kept below a certain set limit value. In the simplest case, the measurement current $I_M$ of the external energy supply 25 is measured by the current control unit 23 and the controlled alternating current source 15 is actuated according to the deficit to bring about the maximum effective value of the summation current $(I_M + i_E)_{Eff}$.

The embodiment of the external energy supply 25, the controlled alternating current source 15 and the current control unit 23 in FIG. 2 can also be implemented in a control location 24 or as a stand-alone unit. Such need not be spelled out in detail, since it only concerns placing the same features in a different setting.

Attached to the two-wire connecting line 4 is: At least one field device 1, which includes at least one AC/DC converter 9, which serves for evaluating and converting the alternating current portion 7 or the mixed current 6 or the injected current $i_E$; at least one DC/DC converter 10, which serves for evaluating and converting the direct current portion 8 of the mixed current 6 or the measurement current $I_M$; at least one control unit 17, which evaluates the electrical sensor signal Sens of the sensor 18 and the electrical control signal Stell of the actuator 19, as well as assuming control of communications and energy supply; and at least one current controller 20, which controls the current of the current loop, or the measurement current $I_M$, for communication. If only one field device 1 is connected to the external supply unit via a connecting line 4, the supply current I is equal to the summation current $I_M + i_E$; otherwise, the supply current is a multiple of the summation current $I_M + i_E$, depending on the number of connected field devices. The chemical or physical process parameter is registered by the measuring transducer 18 and transmitted as an electrical sensor signal Sens via an electrical connection to the control unit 17, which evaluates the sensor signal Sens and correspondingly actuates the current controller 20, so that a proportional measurement current $I_M$ flows in the current loop and that a corresponding measured value MW of the chemical or physical process parameter P is transmitted to the bus coupler 3 and can be further processed there. At the node point K, the two currents, the measurement current $I_M$ and the injected current $i_E$, divide in the field device 1 into two separate current branches. For this purpose, a frequency gate, or a filter, neither being shown explicitly, can be integrated in the node point K into the circuit. The DC/DC converter 10 and the AC/DC converter 9 are connected with the control unit 17 via a control and data line 21, via which, for example, a transmission of the current values and/or control of the current conversion takes place. This control unit 17 is supplied via the supply line 22 from the AC/DC- and DC/DC-converters (9, 10) with the required energy, or power. Control unit 17 represents the heart of the field device 1 and includes a microcontroller μC as at least one integral part. Via this control unit 17, the entire process parameter registering, evaluation and transmission is controlled, as well as the energy management of the field device 1 and, as required, further bus components. Under the energy management of the field device 1 is included not only the control of the current controller 20; rather, via a targeted actuation of the DC/DC converter 10 and the AC/DC converter 9 and, as required, an energy storing buffer (not shown explicitly in FIGS. 2 and 4) contained in the field device 1, the energy supply into the field device 1 can be controlled. Via the control of the AC/DC converter 10 and the conversion of the symmetrical, average-value-free alternating current portion 7 of the mixed current 6 associated therewith into a corresponding effective value 11, the supply of the field device 1 is controllable, so that, for example, always the maximum energy needed by the field device 1 is available to the field device 1. From the external energy supply 25 and the module with the controlled alternating current source 15, always the maximum effective value of the summation current $(I_M + i_E)_{Eff}$ is transmitted to the field device 1. The difference of the energy needed by the field device 1 and the energy available as maximum effective value of the summation current $(I_M + i_E)_{Eff}$ from the external energy supply 25 and the controlled alternating current source 15, is controllable via the AC/DC converter 9 by converting only a certain amount of the alternating current portion 7 into a direct current portion 8. In the case of an energy excess in the field device, such energy or current can be cancelled out of the field device by production of an effective value 11 of the symmetric, average-value-free, alternating current portion 7 of the mixed current 6 negative relative to the direct current portion 8 of the mixed current 6, or measurement current $I_M$, so that such no longer has to be changed in the field device e.g. into heat or some other form of energy.

Figure 3:
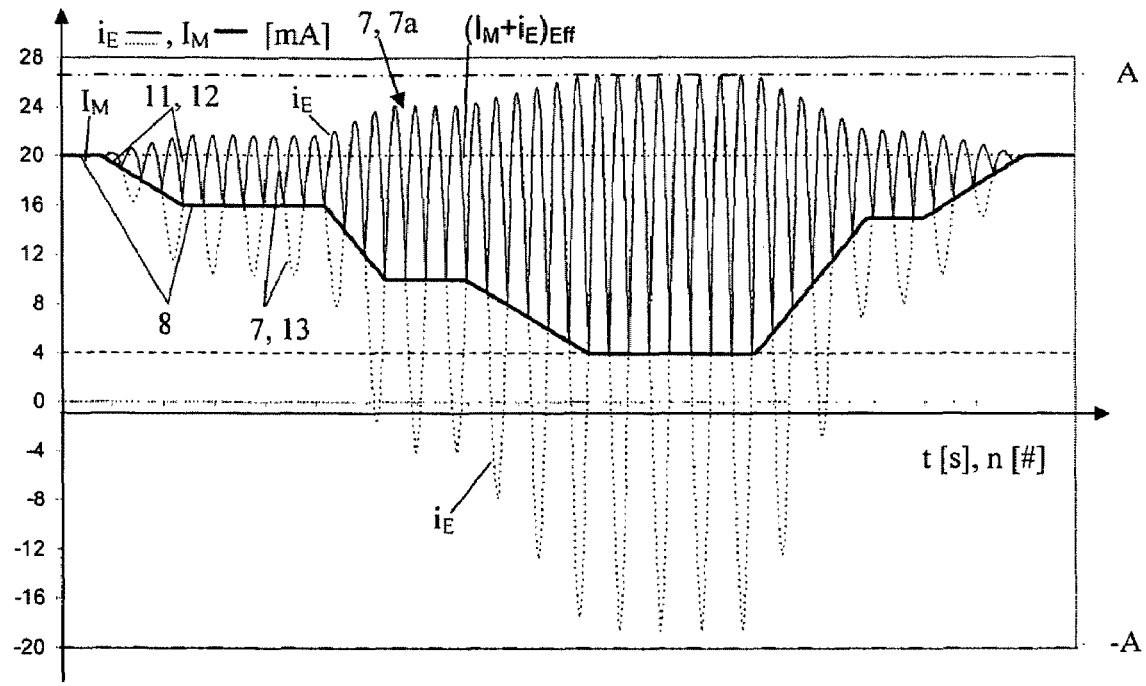
FIG. 3 a diagram of the currents ($I_M$, $i_E$) of a first example of an embodiment of a circuit of a field device of the invention as shown in FIG. 2.

FIG. 3 shows a diagram of the currents in a decentral automation system. The measurement current $I_M$, or the direct current portion 8 of the mixed current, brought about by the current controller 20 or a switching unit 16 in the current loop, is indicated by a trapezoidal function with sections of constant current value. Since changes of the chemical and physical process parameter P mostly require a certain time and do not change instantaneously into the other value, there is situated between the constant values, in which the current value does not change, a certain length of time in which the current value transitions linearly from one constant value into the other constant value. The direct current portion 8, or the measured value $I_M$, assumes values between 4 mA and 20 mA, according to the current-loop standard. Modulated onto this direct current portion 8 of the mixed current 6 is an amplitude-modulated, alternating current portion 7 of the mixed current 6. Alternating current portion 7 has, for example, a sinusoidal signal form 13 and is shown in FIG. 3 as a dashed line. The amplitude of the alternating current portion 7 changes such that the effective value of the summation current $(I_M + i_E)_{Eff}$ of the alternating current portion 7 and the direct current portion 8 of the mixed current, or the measurement current $I_M$ and the injected current $i_E$, which is converted in the AC/DC converter 9 by means of a two-way rectification, assumes a certain constant value. This certain constant value is, for example, the electrical-current value required at the moment for energy supply, or a maximum, constant, limit value 12. The disadvantage of amplitude-modulated signals is that, especially in the case of large distances, the signal amplitude can change within a network, whereby also the effective value 11 is changed. The effective value 11 of an alternating current portion 7 of an electrical current, or alternating current, is that value which produces in a load resistor the same amount of heat as an equally large direct current portion 8, or direct current, effects.

The maximum positive amplitude A and the maximum negative amplitude −A lie in a low current region at a certain frequency f of the alternating current portion 7 whose energy lies under an upper limit, in the case of which an explosive atmosphere would be ignited. The dependence of the ignition behavior of alternating parameters of currents, or alternating currents, and the "intrinsic safety" of field devices 1 associated therewith is known from DE 100 49 233 A1, DE 101 27 561 A1, DE 102 45 273 A1.

The current, or power, supply of the invention for the field device 1 by a mixed current 6 can also be applied in the case in which, for example, already a further alternating current portion 7a, e.g. according to the HART standard, is modulated onto the direct current portion 8 of the 20 mA current loop measurement signal for the communication of data D. For separating the alternating current portion 7 needed for the energy supply of the field device 1 from the further alternating current portion 7a of the Hart signal, the frequencies of the two alternating signals 7, 7a should lie in different frequency bands. The alternating signals 7, 7a lying in different frequency bands can be separated by appropriate filters and separately further processed.

Figure 4:
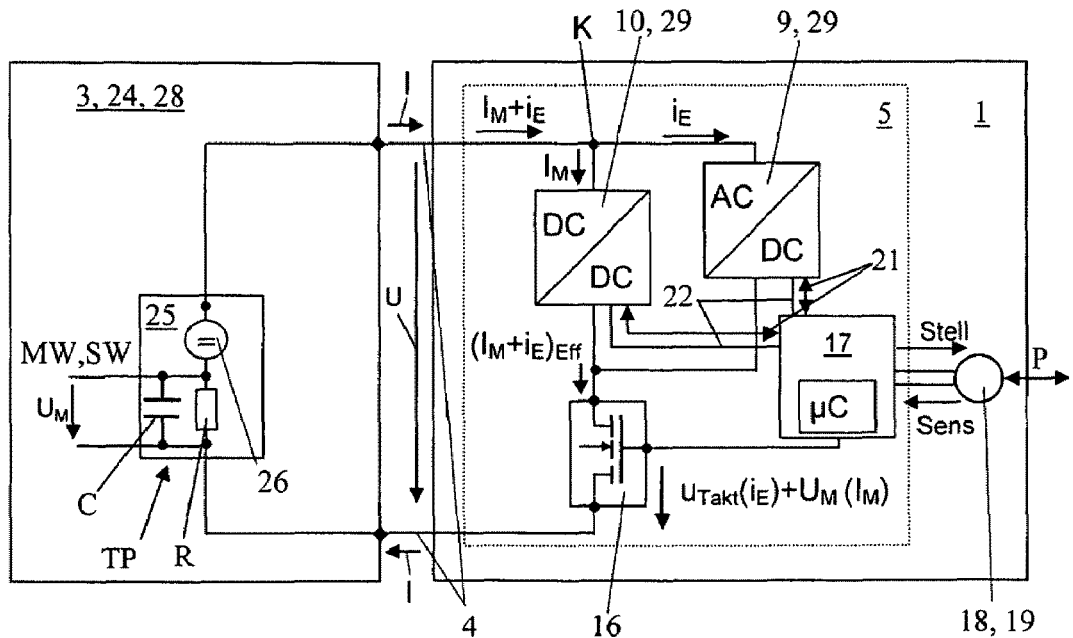
FIG. 4 a second example of a circuit of a field device of the invention, with the field device being connected to the fieldbus via a bus interface.

In FIG. 4, in contrast to FIG. 2, the alternating current portion 7 of the current is not produced by an alternating current source 15 placed ahead of the external energy supply 25 on the current loop, or the two-wire connecting line 4, but, instead, a switching unit 16 is so activated that the required current, or energy, is withdrawn by load modulation in the appropriate frequency by the field device 1 from the external energy supply 25 in the control location 24, in the bus coupler 3, or a further field device 28.

This embodiment of the external energy supply 25 with a direct voltage source 26, as shown in FIG. 4, can also be put into practice in a control location 24 or in a stand-alone unit. Since this construction is equivalent to the description of the bus coupler 3 in FIG. 2, such is not explicitly discussed here.

The chemical or physical process parameter P is registered by the sensor 18 or adjusted by the actuator 19, in that the sensor 18 transmits an electrical sensor signal Sens to the control unit 17, which is further processed there, or the actuator 19 receives from the control unit 17 an electrical control signal Stell. The control unit 17 is responsible for the processing of the electrical control signal Stell, or the sensor signal Sens, and controls on the basis of the processed data the switching unit 16, which produces a corresponding direct current portion 8, or measurement current $I_M$, in the current loop of the two-wire connecting line 4 and the direct current branch in the field device 1. This current flows through the DC/DC converter, which supplies the control unit 17 with the microcontroller μC and further components in the field device electronics 5 of the field device 1 with the required energy. The difference between the required energy in the field device 1 and the energy produced by the direct current portion 8, or measurement current $I_M$, is covered, according to the invention, by an alternating current portion 7 of a mixed current 6. This alternating current portion 7 is produced by the switching element 16, which produces, for example, a pulse width modulated (PWM) or frequency modulated (FWM), rectangular signal. By a limiting of the summation current $I_M + i_E$ in the switching unit 16, the maximum positive amplitude A of the summation current $I_M + i_E$ has an upper limit, which lies below the ignition point of an explosive atmosphere, whereby the field device 1 with the two-wire connecting line 4 is designed to be intrinsically safe. The DC/DC converter 10 and the AC/DC converter 9, on the one hand, convert the alternating current portion 7 and the direct current portion 8 of the mixed current 6 and supply therewith the control unit 17 via the supply line 22 with the necessary energy and, on the other hand, the alternating current portion 7 and the direct current portion 8 of the mixed current are measured and transmitted via the control and data line 21 to the control unit 17. With this measurement data and the current and future energy requirements of the field device 1, the control unit 17 calculates the ratio of the alternating current portion 7 to the direct current portion 8 of the mixed current 6 and controls, accordingly, the switching unit 16.

The control unit 17, which also controls the energy management of the field device 1, can control the DC/DC converter 10 and the AC/DC converter 9 via the control and data line 21 such that only so much energy is converted, as is needed presently, or in the future also, in the field device 1. By the production of an effective value 11 of the alternating current portion negative relative to the direct current portion 8, it is even possible to cancel excess energy, or current, which the field device 1 does not need for supply.

Figure 5:
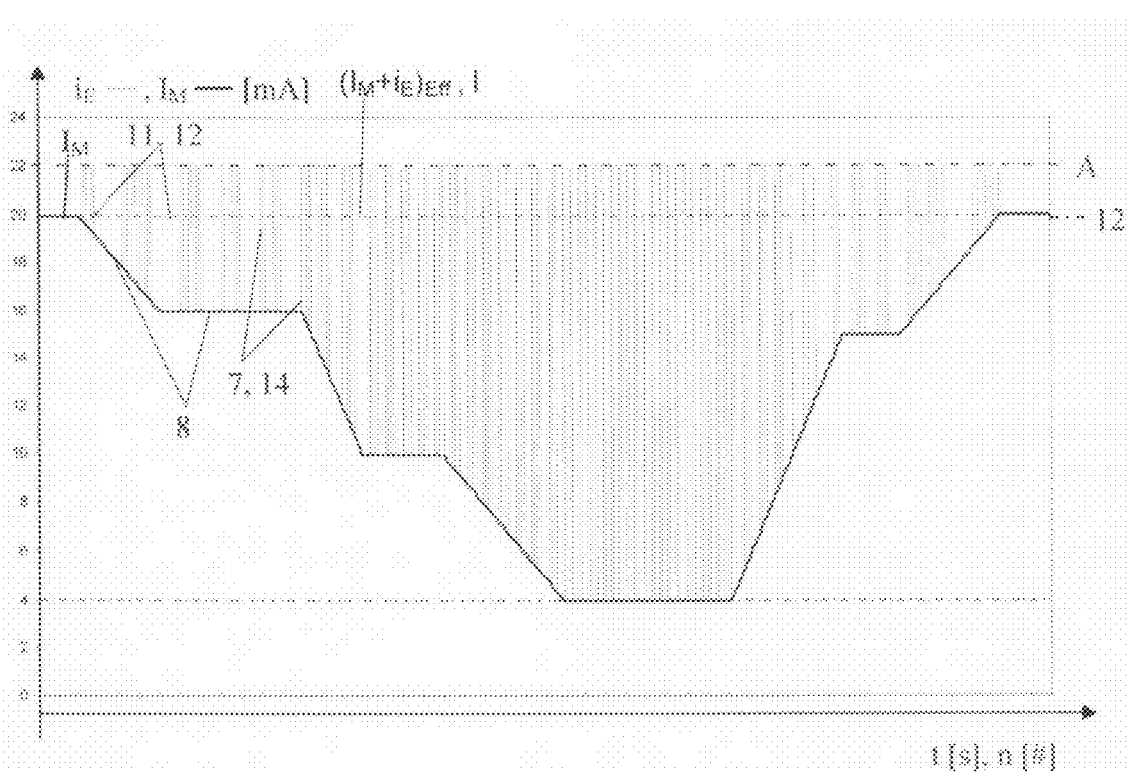
FIG. 5 a first diagram of the currents ($I_M$, $i_E$) of the second example of an embodiment of the circuit of a field device of the invention as shown in FIG. 4.

FIG. 5 shows an electrical current curve, as produced by a circuit construction shown in FIG. 4. The measurement current $I_M$, proportional to the measured or set, chemical or physical process parameter P of the field device 1, is represented by a trapezoidal function drawn with a thicker line. Superimposed on this measurement current $I_M$ is a rectangular and/or pulsed, signal form 14, depending on the manner in which the switching unit 16 is operated under clock control by the control unit 17, such that for short times, pulse currents, as the alternating current portion 7 of the mixed current 6, with a maximum positive amplitude A are modulated onto the direct current portion 8 of the mixed current 6. The duration, or the number of pulses of a pulse sequence varies, as a function of how much current is needed in addition to the measurement current $I_M$, or direct current portion 8, in the field device. That is, depending on how large the difference of the current requirement is compared to the current offered, current pulses of a certain frequency f are added onto the measurement current $I_M$ for a corresponding time window, so that the effective value $(I_M + i_E)_{Eff}$ of the summation current meets the currently needed current value of the electrical current requirement for energy supply of the field device 1. In FIG. 5, the maximum current requirement of the field device was assumed, so that the effective value $(I_M + i_E)_{Eff}$ of the summation current assumes the limit value 12 of 20 mA and the field device 1 is therefore supplied continuously and constantly with maximum current. The rectangular and/or pulsed signal forms of the alternating current portions 7 have the disadvantage that these signal forms possess a multiplicity of upper harmonics and thus cover a large frequency range, whereby into the circuit of FIG. 4 filters (not shown) must be inserted, in order that the measurement current $I_M$, or direct current portions 8, of the mixed current 6 not be, or only slightly be, changed by these pulse sequences. Also, by negative pulse sequences, whose amplitudes have a smaller electrical-current value than the instantaneous measured current $I_M$, only so much energy is supplied to the field device as the field device 1 currently needs. In this way, it is assured that the field device 1 only draws as much energy from the fieldbus as it currently needs and the direct current portion 8 of the mixed current 6, or measurement current $I_M$, can be set almost uninfluenced thereby, as a function of the change of the process parameter.

Figure 6:
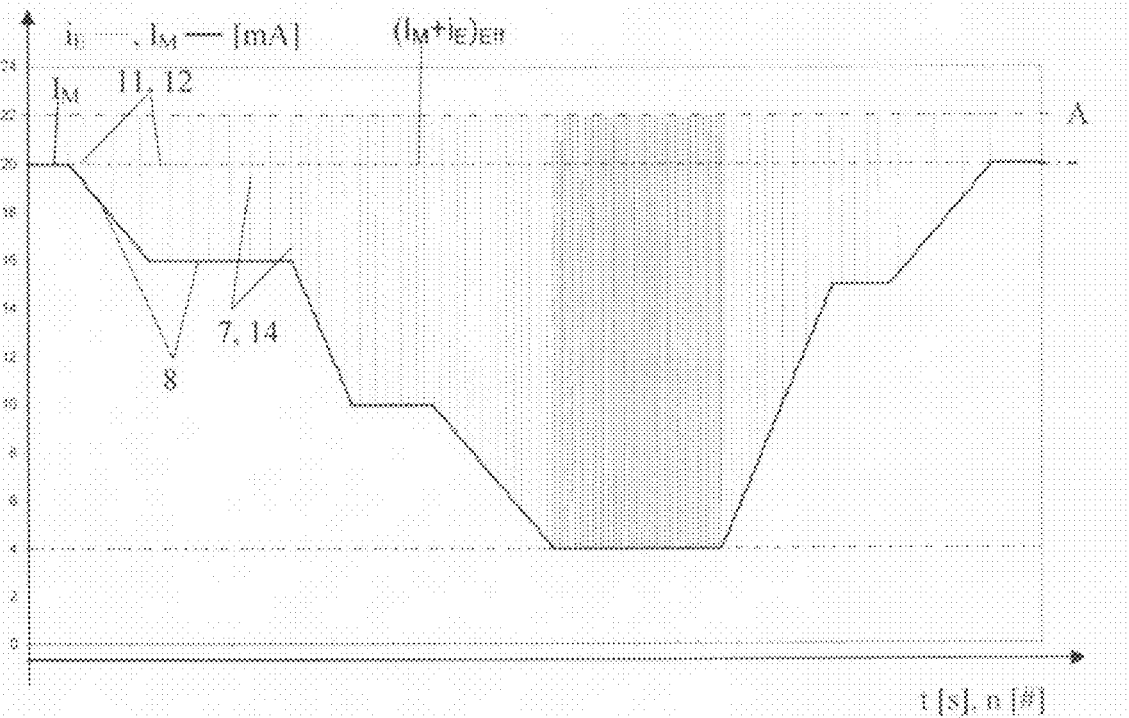
FIG. 6 a second diagram of the currents ($I_M$, $i_E$) of the second example of an embodiment of the circuit of a field device of the invention as shown in FIG. 4.

The diagram in FIG. 6 differs from the diagram in FIG. 5 in that individual pulse sequence packets with the same frequency f are not modulated-on in a time window, but, rather, in this diagram, rectangular functions are shown, whose duration depends on the measurement current $I_M$. In this type of modulation, one speaks of a pulse-width modulated, rectangular signal (PWM). This type of modulation can be implemented according to the invention by providing that, in the case of small differences of the measurement current $I_M$, or the direct current portion 8, of the mixed current 6, from the desired effective value $(I_M+i_E)_{Eff}$ of the summation current, a correspondingly small value is set between the pulse-pause ratio. If, in contrast, the measurement current $I_M$ is instantaneously very small, a large value is achieved in the pulse-pause ratio, e.g. by a short pause length and a longer pulse length.

Other forms of modulation of current and voltage signals can be applied, such as e.g. frequency modulated (FMW) alternating signals 7, which, because of the similarity to the preceding examples of embodiments, are not explained explicitly in more detail.

LIST OF REFERENCE CHARACTERS 1 field device
2 external fieldbus system
3 bus interface, bus coupler
4 two-wire connecting line
5 field-device electronics
6 mixed current
7 alternating current portion
7a alternating current portion, HART signal
8 direct current portion
9 AC/DC converter
10 DC/DC converter
11 effective value
12 limit value
13 sinusoidal signal form
14 rectangular and/or pulsed signal form
15 controlled alternating current source
16 switching unit
17 control unit
18 measuring transducer, sensor
19 signal converter, actuator
20 current controller
21 control and data line
22 supply line
23 current control unit
24 control location
25 external energy supply
26 direct voltage source
27 measurement transmitter
28 further field device
29 internal supply circuit
SW control value
MW measured value
D data
P (chemical or physical) process parameter
Sens electrical sensor signal
Stell electrical control signal
µC microcontroller
Ex explosion protection region, intrinsically safe region
non-explosion protection region, non-intrinsically safe region
R resistor
C capacitor
TP low-pass
I supply current
$I_M$ measurement current, current-loop current
$i_E$ injected current
$I_M+i_E$ summation current
$(I_M+i_E)_{Eff}$ effective value of the summation current
$U_M$ measurement voltage
U supply voltage
K node point
A maximum positive amplitude
−A maximum negative amplitude
f frequency

The invention claimed is:

1. Field device electronics for a field device, said field-device electronics being fed by an external electrical energy supply, said external energy supply providing a supply voltage and delivering a variable supply current driven thereby, said field device electronics comprising:
　at least one internal control unit for controlling the field device; and
　at least one internal supply circuit feeding said at least one internal control unit, wherein:
　the supply current is a mixed current, which is formed by superimposing an alternating current portion onto a direct current portion and/or a modulation of an alternating current portion onto a direct current portion; and
　said at least one internal supply circuit uses, at least at times and/or at least in part, also the alternating current portion of the mixed current for covering an instantaneous energy requirement of said at least one internal control unit.

2. The field-device electronics as claimed in claim 1, wherein:
　the alternating current portion is a high-frequency alternating current portion; and/or
　the direct current portion is a variable direct current portion; and/or
　the energy requirement of the field device is partially covered by the direct current portion of the mixed current; and/or
　the direct current portion of the mixed current serves as an information carrier or communications means for data transmitted via a two-wire connecting line.

3. The field-device electronics as claimed in claim 1, further comprising:
　a sensor for registering at least one chemical and/or physical process parameter, said sensor delivering an electrical sensor signal corresponding with the process parameter, wherein:
　the direct current portion of the mixed current serves as an information carrier or communications means for data transmitted via a two-wire connecting line; and
　the transmitted data are measured values derived from the sensor signal by means of said field-device electronics and/or to be mapped by means of said external energy supply.

4. The field-device electronics as claimed in claim 1, further comprising:
　at least one actuator controlled by an electrical control signal, said actuator adjusting the at least one chemical and/or physical process parameter, wherein:
　the direct current portion of the mixed current serves as an information carrier or communications means for data transmitted via a two-wire connecting line; and
　the transmitted data are control values to be converted into the control signal by means of said field device electronics.

5. The field-device electronics as claimed in claim 1, wherein:
the direct current portion of the mixed current serves as an information carrier or communications means for data transmitted via a two-wire connecting line; and
the transmitted data are values to be mapped by means of said external energy supply.

6. The field-device electronics as claimed in claim 1, wherein:
the direct current portion of the mixed current shows values within a current range of 4 mA to 20 mA; and/or the alternating current portion of the mixed current shows a frequency of greater than 10 Hz; and/or
the alternating current portion of the mixed current shows an effective value, which is smaller than or equal to a highest allowable limit value.

7. The field-device electronics as claimed in claim 1, wherein:
the alternating current portion of the mixed current shows a frequency of greater than 50 Hz.

8. The field-device electronics as claimed in claim 1, wherein:
the alternating current portion of the mixed current shows an effective value, which is smaller than or equal to a highest allowable limit value of the mixed current, said highest allowable limit value of the effective value amounting to 20 mA; and/or
the alternating current portion of the mixed current shows an effective value, which is smaller than or equal to a difference value of the direct current portion of the mixed current from a highest allowable limit value of the mixed current.

9. The field-device electronics as claimed in claim 1, further comprising:
a switching unit of the field device which produces the alternating current portion of the mixed current by means of a load modulation
wherein:
an alternating current portion of the mixed current modulated negatively onto the direct current portion cancels excess energy of the field device; and/or
a controlled alternating current source produces in the external energy supply the alternating current portion of the mixed current.

10. The field-device electronics as claimed in claim 1, further comprising:
a switching unit of the field device which produces the alternating current portion of the mixed current by means of a load modulation, wherein:
said at least one control unit serves for controlling said switching unit based on instantaneous and future energy needs of the field device and/or additionally based on instantaneous and future electrical sensor signal or control signal of the field device for open-loop and/or closed-loop control of a current controller, which cares for setting, as information carrier, the direct current portion of the mixed current.

11. The field-device electronics as claimed in claim 10, wherein:
said at least one control unit ascertains and calculates future energy requirements of the field device taking into consideration and estimating processes and applications running in the future.

12. The field-device electronics as claimed in claim 1, further comprising:
a sensor for registering at least one chemical and/or physical process parameter, said sensor delivering an electrical sensor signal corresponding with the process parameter.

13. The field-device electronics as claimed in claim 1, further comprising:
at least one AC/DC converter and/or at least one DC/DC converter.

14. The field-device electronics as claimed in claim 1, further comprising:
at least one actuator controlled by an electrical control signal, said actuator adjusting the at least one chemical and/or physical process parameter.

15. The field-device electronics as claimed in claim 14, further comprising:
at least one AC/DC converter and/or at least one DC/DC converter.

16. The field-device electronics as claimed in claim 1, further comprising:
at least one AC/DC converter and/or at least one DC/DC converter.

17. The field-device electronics as claimed in claim 1, wherein:
a further alternating current portion of the mixed current is modulated onto the direct current portion distinguishably from the alternating current portion, and/or in frequency band separately, as an information carrier.

18. The field-device electronics as claimed in claim 1, wherein:
the alternating current portion of the mixed current shows a sinusoidal signal form.

19. The field-device electronics as claimed in claim 1, wherein:
the alternating current portion of the mixed current shows a rectangular and/or pulsed signal form.

* * * * *